F. W. ELSINGER AND O. SCHMIDT.
REELING AND UNREELING DEVICE.
APPLICATION FILED SEPT. 9, 1918.
1,311,956.
Patented Aug. 5, 1919.
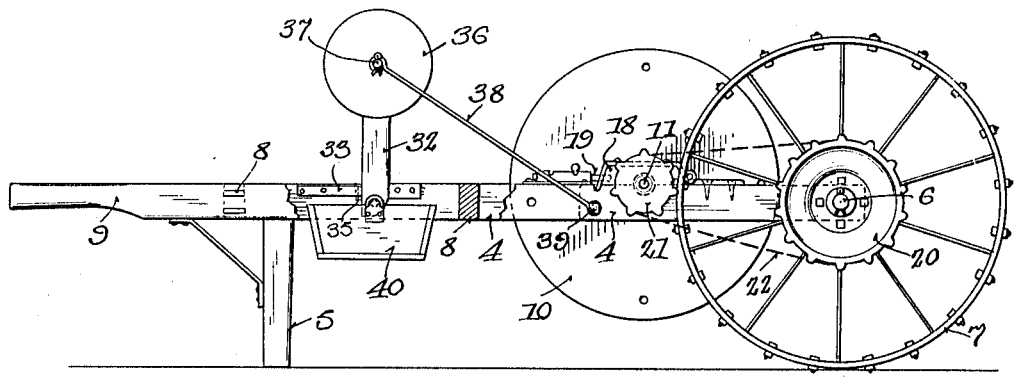
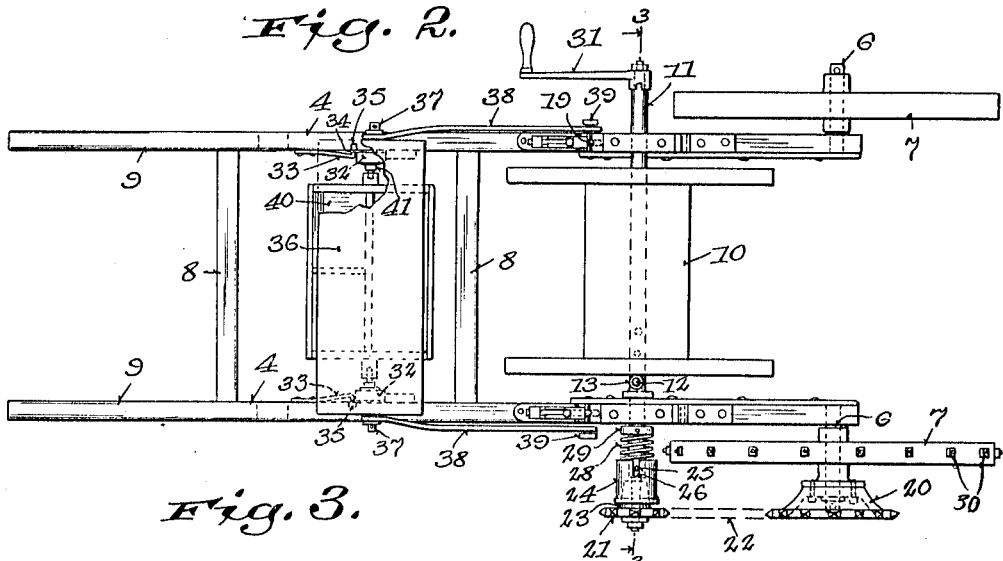
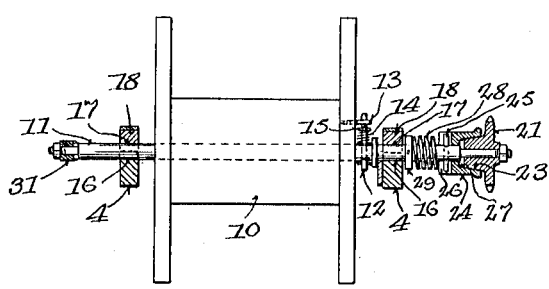

UNITED STATES PATENT OFFICE.

FRANCIS W. ELSINGER AND OSCAR SCHMIDT, OF HARTFORD, WISCONSIN.

REELING AND UNREELING DEVICE.

1,311,956.   Specification of Letters Patent.   Patented Aug. 5, 1919.

Application filed September 9, 1918. Serial No. 253,233.

*To all whom it may concern:*

Be it known that we, FRANCIS W. ELSINGER and OSCAR SCHMIDT, citizens of the United States, and residents of Hartford, in the county of Washington and State of Wisconsin, have invented new and useful Improvements in Reeling and Unreeling Devices, of which the following is a description, reference being had to the accompanying drawings, which are a part of this specification.

The invention relates to reeling and unreeling devices for use with fence wire, telephone wires or cables, rope, hose, chain, etc., and is fully described and explained in the specification and shown in the accompanying drawings, in which:

Figure 1 is an elevational view of the device embodying the invention, parts being broken away and parts being shown in section; Fig. 2 is a plan view, parts being broken away; Fig. 3 is a detail sectional view of the roller taken on the line 3—3 of Fig. 2.

In the drawings, the numeral 4 designates the side frame members, 5 the supporting legs secured thereto, 6 the short axles carried thereby, 7 the rear wheels mounted on the axles, and 8 the transverse frame members. The extensions 9 of the frame members 4 form handles so that on lifting the handles upwardly to remove the legs 5 from contact with the ground the device forms a two-wheeled truck which may be pushed along with the wheels moving on the ground.

The reel or drum 10 is mounted upon a shaft 11 and detachably locked thereto by means of a locking pin 12 passing through the shaft and through an eyebolt 13 on the drum in which it is held by means of a spring 14 interposed between said shaft and a collar 15 secured to the pin. The shaft 11 is removably journaled in the frame members 4 being seated in bearing grooves 16 in said members and grooves 17 in bearing blocks 18 pivotally secured at one end to the members 4 and detachably secured at their other ends to said members by a sliding bolt lock 19 of usual construction.

The drum 10 is drivingly connected to one of the wheels 7 of the truck by means of a sprocket wheel 20 carried by this wheel, a sprocket wheel 21 loosely mounted on the shaft 11, a detachable chain 22 connected to said sprocket wheels and an automatic friction clutch connecting the sprocket 21 with the shaft 11. This clutch consists of a cone 23 formed integral with the sprocket 21 and engaging a clutch member 24, slidably but non-rotatably secured to the shaft 11 by pins 25 on said shaft, and slots 26 in said member, and provided with a conical recess 27 receiving the cone 23 and yieldingly held thereagainst by a spring 28 interposed between said member 24 and a collar 29 carried by the shaft. The driving wheel is provided with projecting studs 30 to secure better traction. The drum may also be turned by means of a hand crank 31.

With the construction thus far described the material, such as rope, wire or cable is wound up on the drum by pushing the truck along in the direction of the unwound rope, wire or cable under which conditions the rotation of the drive wheel will, through the wheels 20, chain 22, wheel 21 and the clutch above described, rotate the drum to wind the material upon it. As the material is wound up on the drum its diameter increases, and to provide for an even winding we have devised the automatic clutch above described which permits a slippage between the shaft 11 and the sprocket 21 as the diameter of the material upon the drum increases.

Pivotally mounted upon the forward portion of the truck are a pair of uprights 32 which are maintained in upright position by means of spring locking fingers 33 and which may be turned down to inoperative position by moving the fingers 33 inwardly so that their ends 34 seat in the grooves 35. These uprights 32 form a rest for a roller 38 which is mounted upon a shaft 37 hung from the members 4 by means of pivot rods 38 removably secured at their inner ends by bolts 39 to the frame members 4.

In unwinding the material from the drum 10 the device is turned over so that its position in Fig. 1 would be inverted, in which instance the roller 36 would run on the ground and the line of material running off the reel would pass under this roller and would thus be tensioned and properly positioned or guided on the ground, it being understood of course that in unreeling the drum is free to rotate with the shaft 11 by removing detachable chain 22 from sprocket wheels 20 and 21. When not in use the roller 36 is carried by the uprights or it may be removed from the machine.

As a necessity for the operation of the device a tool box 40 is removably swingingly mounted on trunnions 41 secured to the uprights 32. The tool box is necessary as it forms a receptacle for receiving the chain 22 which is removed during the operation of unreeling.

Owing to the fact that it is difficult to lift the loaded reel off of the truck when it is loaded with heavy material, the machine may be swung over to inverted position and the pivoted bearing blocks unlocked so that the loaded reel may be deposited on the ground, and shaft 11 removed from the drum by unlocking the locking pin 12 and extracting shaft 11 from drum 10, and an empty drum replaced.

What we claim as our invention is:—

1. In a device of the character described, the combination with a two-wheeled truck, of a shaft, means for removably journaling said shaft upon said truck, a drum mounted on and free to rotate on said shaft, a receiver secured to one side of the drum and adjacent said shaft, a spring actuated locking pin adapted to be passed through said shaft and said receiver to detachably lock the drum to said shaft, and a driving connection between said drum and one of the wheels of the truck.

2. In a device of the character described, the combination with a two-wheeled truck, of a pair of bearing blocks each pivotally secured at one end and detachably secured at its other end to the truck, a shaft rotatably mounted on the truck and journaled in said bearing blocks, a drum secured to said shaft, a sprocket secured to one of the wheels of the truck, a sprocket loosely mounted on said shaft, a chain running on said sprocket, and a friction clutch for securing said last named sprocket to said shaft.

3. In a device of the character described, the combination with a truck, of a reel rotatably mounted thereon, and a ground engaging roller swingingly mounted on said truck, the line of material running off said reel passing between the roller and the ground, whereby the material will be tensioned and properly positioned on the ground, substantially as described.

In testimony whereof, we affix our signatures.

FRANCIS W. ELSINGER.
OSCAR SCHMIDT.

Copies of this patent may be obtained for five cents each, by addressing the "Commissioner of Patents, Washington, D. C."